H. MOFFATT.
SOLUTION FORMING DEVICE.
APPLICATION FILED MAY 21, 1919.

1,365,183.

Patented Jan. 11, 1921.

Inventor
Howard Moffatt
by James T. Barkelew
his Attorney.

UNITED STATES PATENT OFFICE.

HOWARD MOFFATT, OF LOS ANGELES, CALIFORNIA.

SOLUTION-FORMING DEVICE.

1,365,183.   Specification of Letters Patent.   Patented Jan. 11, 1921.

Application filed May 21, 1919. Serial No. 298,616.

*To all whom it may concern:*

Be it known that I, HOWARD MOFFATT, M. D., a citizen of the United States, residing at Los Angeles, in the county of Los Angeles, State of California, have invented certain new and useful Improvements in Solution-Forming Devices, of which the following is a specification.

This invention relates to solution forming devices adaptable for various purposes, but designed and adapted particularly for forming solutions for douches; and it is an object of the invention to provide a device of extreme simplicity and ease of operation which can be used without requiring any particular skill, and which can be attached to a water supply fixture, such as a bath tub or other fixture for the supply of water.

It is also an object of this invention to provide a device in which a thorough mixture is obtained and in which the solution is uniform at all times. There are other objects of the invention which will appear from the following detailed description of preferred forms of the device, reference for this purpose being had to the accompanying drawings in which—

Figure 1:
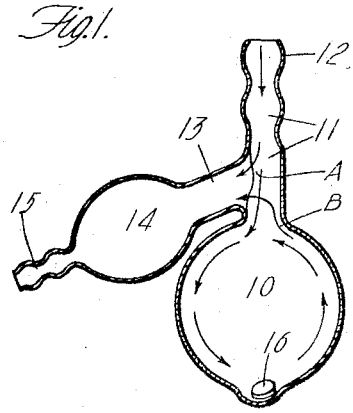
Figure 2:
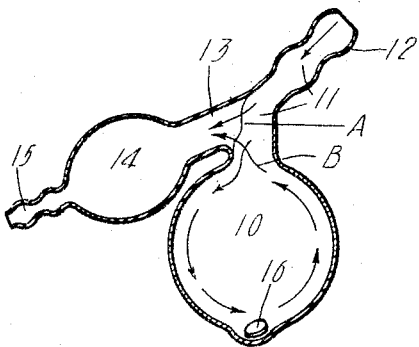
Figure 3:
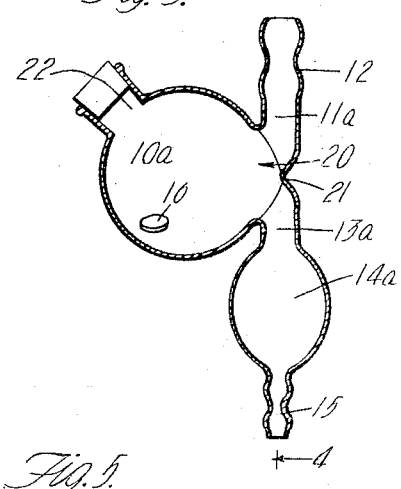
Figure 4:
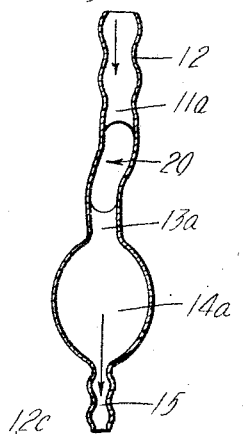
Figure 5:
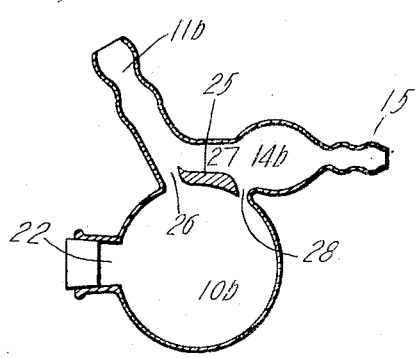
Figure 6:
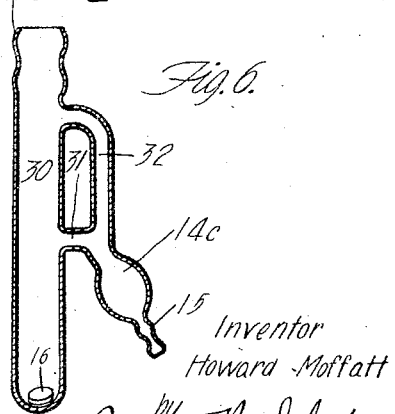

Figure 1 is a sectional view showing one form of my solution forming device; Fig. 2 is section of slightly modified form; Fig. 3 is a section of another modified form; and Fig. 4 is a detail section taken as indicated by line 4—4 on Fig. 3; Fig. 5 is a section of a further modified form; and Fig. 6 is a section of another modified form.

Referring first to the device shown in Figs. 1 and 2, I show therein a bulb 10 of suitable size. To give an idea of the size of my device I may say that the bulb 10 may be about 2″ or so in diameter, although the device is of course not restricted to this small size, but a device of this size is sufficient for forming a solution of sufficient volume for the purposes specified. From this bulb there extends a neck 11 and the end of the neck is conformed as indicated at 12 for the attachment of a tube or hose by which the device may be connected to the water supply. Although, for simplicity's sake I herein illustrate the neck as being adapted to be connected to the water supply simply by a rubber tube or the like, it will be understood that my invention is not limited to the use of any particular means of connection to the water supply, as any suitable means may be used.

From neck 11 a side branch or tube 13 extends off to a mixing bulb 14 from which there is an outlet tube 15 also shaped for taking the rubber hose, being that rubber hose which leads to the douche nozzle. Neck 11 may be either directly radial to the bulb 10 or it may turn at an angle, as shown in Fig. 2. The side tube 13 may be either close to the bulb 10 or farther removed from it, depending upon the results desired. How this position of the side branch 13 affects the strength of the solution will be understood when the following mode of operation is taken into account.

A tablet 16 of suitable substance is introduced into the bulb. In the simple form shown in Figs. 1 and 2 this tablet may be introduced through the neck 11. But I may provide special means for introducing a tablet, as is hereinafter described. Water enters through the neck 11 and fills the bulb 10 and also flows through the side branch 13 into the mixing bulb 14 and thence out through the outlet 15. After the bulb 10 becomes filled the major portion of the water goes through the side branch 13; but there is then maintained in the bulb 10 a comparatively slow circulation of water around in the direction indicated by the arrows, causing a circulation of water over the tablet 16. The tablet 16 dissolves, the rapidity of dissolution depending upon the rate of solubility of the tablet. The solution is thus formed in the water in the bulb 10. The fact that the stream of water flowing through neck 11 is divided at or about the point denoted A causes the flow into the bulb 10 to be unequally distributed over the opening which leads into the bulb. There is a tendency for the flow of water into the bulb to concentrate more or less to the left of this opening as is indicated by the arrows in Figs. 1 and 2; and this is true even in the form shown in Fig. 1.

As a consequence a small amount of the solution in the bulb is continuously forced out through the bulb opening as is indicated by the arrow at B; and this outflow of solution is caught in the main stream of water passing into and through the side branch 13 and passes with that main stream of water into the mixing bulb 14. The mixing bulb being of larger capacity than the side tube 13, the two streams of liquid are thoroughly mixed in the bulb before they pass through the outlet 15.

Now the amount of solution which flows out of the bulb 10 depends upon the relative disposition of the inlet tube 11, the side branch tube 13, and the bulb 10. The diversion of stream flow through the side branch 13, which is preferably placed angularly to the inlet 11 for this purpose, causes the stream flow into the bulb 10 to be unsymmetrical with the opening into the bulb; and it is this inequality or unevenness of flow into the bulb that allows discharge of the solution from the bulb into the main stream of water. Now it will be readily seen that this effect is controlled by the relative positions of the parts 11 and 13 to each other and by the distance between the side branch 13 and the bulb 10. By placing the inlet tube 11 at an angle as shown in Fig. 2, the effect may be modified; and the effect may also be modified by placing the point of communication of side branch 13 with passage 11 nearer to or farther from the bulb 10; or the effect may be modified by changing the angle of side branch 13.

I have now set forth a preferred specific form of the device embodying my invention. Although I do not limit myself to this particular form of invention, I have found it to be desirable because of its extreme simplicity and because of its very effective and uniform action. The particular form shown in Fig. 1 produces a very uniform solution throughout the whole period during which the tablet 16 dissolves. The whole device may be an integral piece of blown or cast glass; this material being preferred on account of its transparency and the facility with which it may be cleaned.

In Figs. 3 and 4 I show another form of device in which the inlet tube 11$^a$ and the outlet 13$^a$ are arranged in the same plane and somewhat as continuations of each other, except that outlet 13$^a$ is offset from the inlet as illustrated in Fig. 4. The inlet leads tangentially into bulb 10$^a$ through an opening 20; and the wall at 21 may be so shaped as to more or less direct fluid through the opening 20 into the bulb. It will of course depend upon the shape of the part 20 and the amount of offset between 11$^a$ and 13$^a$ as to what proportion of the liquid is put through the bulb. Outlet 13$^a$ may have mixing bulb 14$^a$ which performs the same office as hereinbefore described. A stoppered opening at 22 may provide means for inserting the tablet 16.

In Fig. 5 I illustrate a somewhat different form in which the flow of liquid through the inlet 11$^b$ is divided by a diversion wall 25 so that part of the liquid flows through opening 26 into bulb 10$^b$ and a part flows through passage 27 into mixing bulb 14$^b$; there being another opening 28 from the bulb 10$^b$ into the mixing bulb 14$^b$. It is apparent that the proportions of the mixture formed in this device will depend upon the relative disposition of the parts and the relative sizes of the openings and passages.

In Fig. 6 I illustrate another form in which I use a relatively long tube 30, the upper end at 12$^c$ being conformed for suitable attachment to the water supply. The tablet 16 is placed in the bottom of the tube and the solution formed by the dissolving of the tablet extends itself up in the tube as high as the lower passage 31 which leads from the tube 30 into the mixing bulb 14$^c$. There is another passage 32 which leads from a point higher up on tube 30 and also leads to the mixing bulb. The stream of water passing through passage 32 mixes with the stream of water carrying solution which passes through passage 31, and mixing takes place in the mixing bulb 14$^c$.

With the aid of the foregoing specific descriptions it is thought that my invention will be made clearly apparent. It will of course be understood that the strength of solution in any case will depend upon the rapidity with which the tablet dissolves; or, with a solution of any given strength formed in the tablet chamber, the strength of final solution will depend on the rate at which the solution flows out of that chamber. Although I prefer to use medicament in tablet form, it will readily be seen that the device will operate if the chamber is first filled with a solution of any suitable strength.

Having described a preferred form of my invention, I claim:

1. In a solution forming device, a structure embodying a medicament holding chamber, a mixing chamber, an inlet passage to the medicament holding chamber, an outlet passage from the mixing chamber, and a communication passage between the inlet passage and the mixing chamber placed in such relation to the inlet passage that a portion of the fluid stream through the inlet passage is diverted directly into the communication passage.

2. In a solution forming device, a structure embodying a medicament holding chamber, a mixing chamber, an inlet passage to the medicament holding chamber, an outlet passage from the mixing chamber, and a communication passage between the inlet passage and the mixing chamber placed in such relation to the inlet passage that a portion of the fluid stream through the inlet passage is diverted directly into the communication passage; the communication passage joining the inlet passage close to the point of discharge of the inlet passage into the medicament holding chamber.

3. In a solution forming device, a structure embodying a medicament holding chamber, an inlet passage leading to said chamber, and a side branch passage leading out of the inlet passage in proximity to the chamber, so that by diversion of fluid flow into the side branch the flow of fluid into the chamber is non-uniform over the cross-section of the entrance of the inlet passage to the chamber.

4. In a solution forming device, a structure having a medicament holding chamber, an inlet passage leading to the chamber and forming the sole entrance to and exit from the chamber, a side branch passage leading out of the inlet passage; and the structure and arrangement of the passages embodying means for diverting the flow of fluid to make it non-uniform over the cross-section of the entrance of the inlet passage to the chamber.

5. In a solution forming device, a unitary structure embodying a bulb and an inlet passage leading thereto, and a side branch discharge passage leading angularly from the inlet passage at a point near the bulb.

6. In a solution forming device, a unitary structure embodying a medicament holding bulb and an inlet passage leading thereto, a mixing bulb, a side branch passage to the mixing bulb leading angularly from the inlet passage at a point near the medicament holding bulb, and an outlet passage leading from the mixing bulb.

In witness that I claim the foregoing I have hereunto subscribed my name this 14th day of May, 1919.

HOWARD MOFFATT, M. D.

Witness:
VIRGINIA BERINGER.